(12) United States Patent
Oberdorfer

(10) Patent No.: US 11,536,338 B2
(45) Date of Patent: Dec. 27, 2022

(54) AUTOMATIC SLACK ADJUSTER TORQUE LIMITING LINK

(71) Applicant: Bendix Commercial Vehicle Systems LLC, Elyria, OH (US)

(72) Inventor: Erik W. Oberdorfer, Akron, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 17/119,643

(22) Filed: Dec. 11, 2020

(65) Prior Publication Data

US 2022/0186801 A1 Jun. 16, 2022

(51) Int. Cl.
*F16D 65/38* (2006.01)
*F16D 65/54* (2006.01)
*F16D 125/28* (2012.01)

(52) U.S. Cl.
CPC ........ *F16D 65/543* (2013.01); *F16D 2125/28* (2013.01)

(58) Field of Classification Search
CPC ...... F16D 65/543; F16D 65/38; F16D 65/383; F16D 65/386; F16D 65/40; F16D 65/52; F16D 65/54; F16D 65/546; F16D 65/56; F16D 65/567; F16D 65/22; F16D 65/60; B61H 15/0007; B61H 15/0021; B61H 15/0028
See application file for complete search history.

(56) References Cited

U.S. PATENT DOCUMENTS

| | | | |
|---|---|---|---|
| 3,371,755 A * | 3/1968 | Leeper | F16D 65/60 188/79.53 |
| 3,498,423 A | 3/1970 | Belart | |
| 3,921,765 A * | 11/1975 | Swander, Jr. | F16D 65/60 188/79.55 |
| 4,019,612 A | 4/1977 | Mathews et al. | |
| 4,249,644 A | 2/1981 | Urban | |
| 4,394,800 A | 7/1983 | Kleinhagen, Jr. | |
| 5,036,958 A * | 8/1991 | Yamamoto | F16D 65/60 188/79.55 |
| 6,360,859 B1 * | 3/2002 | Angerfors | F16D 65/44 74/102 |

(Continued)

FOREIGN PATENT DOCUMENTS

WO WO-9303288 A1 * 2/1993 ............ F16D 65/60

OTHER PUBLICATIONS

International Search Report (PCT/ISA/210) issued in PCT Application No. PCT/US2021/072751 dated Mar. 22, 2022 (three (3) pages).

(Continued)

*Primary Examiner* — Vishal R Sahni
(74) *Attorney, Agent, or Firm* — Crowell & Moring LLP

(57) ABSTRACT

A self-adjusting automatic slack adjuster for reducing slack in the brake of a vehicle includes an adjuster link having a resilient portion. When a brake application force being applied to the slack adjuster exceeds a level that could result in brake application linkage damage as a result of the slack adjuster's slack adjustment mechanism having reached a travel limit, the resilient portion of the adjuster link permits the axial length of the adjuster link to change to accommodate the high brake application force in order to minimize or preclude damage to the brake application linkage.

16 Claims, 4 Drawing Sheets

(56) References Cited

U.S. PATENT DOCUMENTS

| | | | |
|---|---|---|---|
| 7,198,138 B2* | 4/2007 | Chadha | F16D 65/60 188/79.55 |
| 10,378,604 B2 | 8/2019 | Oberdorfer | |
| 2004/0026193 A1 | 2/2004 | Philpott | |
| 2019/0178319 A1* | 6/2019 | Oberdorfer | F16D 65/58 |

OTHER PUBLICATIONS

Written Opinion (PCT/ISA/237) issued in PCT Application No. PCT/US2021/072751 dated Mar. 22, 2022 (six (6) pages).

\* cited by examiner

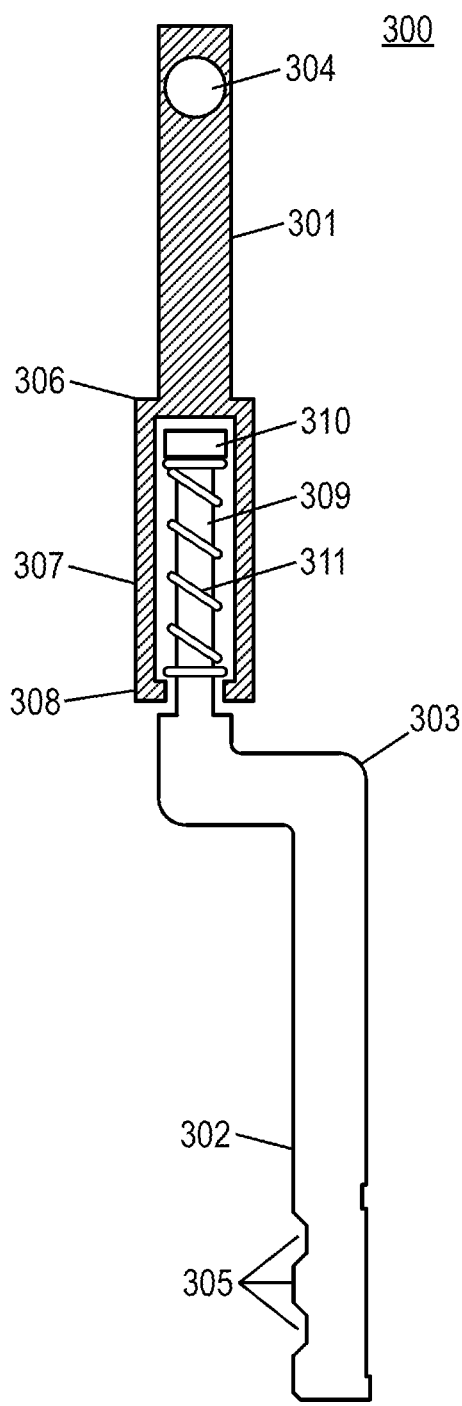
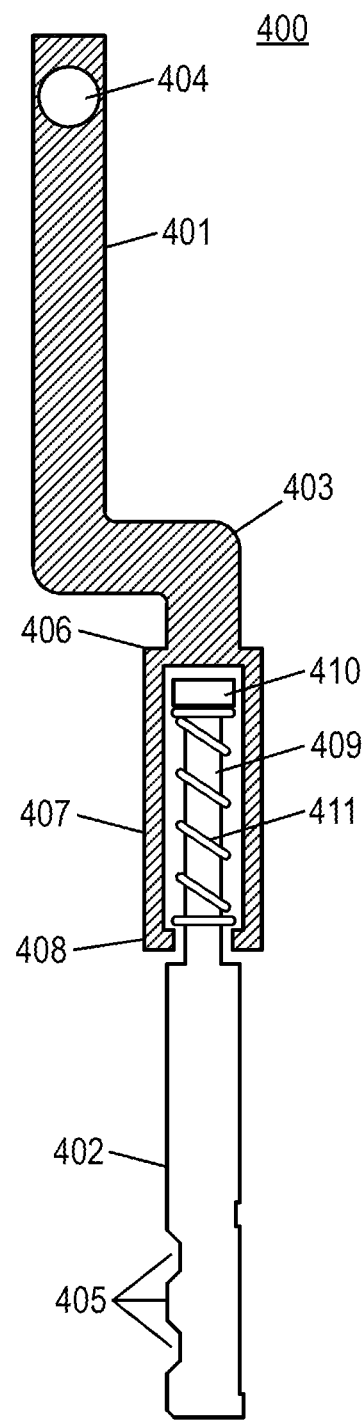
FIG. 3
FIG. 4

AUTOMATIC SLACK ADJUSTER TORQUE LIMITING LINK

BACKGROUND AND SUMMARY OF THE INVENTION

The present invention relates to brakes used on, for example, commercial truck or trailer axles, and in particular to automatic slack adjusters which eliminate excess motion in a brake actuator mechanism used to apply the brake.

Over the life of the brake linings of a brake, such as a pneumatic drum brake used on commercial vehicle axles, the clearance between the brake linings and their respective friction surfaces (for example, the inner surface of a brake drum) increases as the brake's friction linings or drum surfaces wear. This increasing clearance requires an ever-increasing range of motion from the brake actuator mechanism to move the brake linings from their rest position to the point at which the linings contact the friction surface.

It has become commonplace to include an automatic slack adjuster in the mechanical path between the brake actuator and the brake linings so as to eliminate excess lining travel slack and or brake stroke as the brake linings wear. Such adjusters typically are: (i) located on a portion of a brake cam shaft which is outside of the brake (typically splined to the cam shaft); and (ii) coupled to a pushrod of a brake actuator such that when the brake actuator push rod is extended or retracted, the slack adjuster rotates about the longitudinal axis of the brake cam shaft. Thus, by extending or retracting the brake actuator pushrod, the slack adjuster causes the brake cam shaft to rotate about its longitudinal axis, which in turn rotates a brake actuation cam located within the drum brake that is affixed to the end of the brake cam shaft. The rotation of the cam either presses the brake linings into engagement with the brake drum inner friction surface or allows the brake linings to withdraw radially inward, away from the friction surface.

Automatic slack adjusters are typically designed to transmit brake actuator force to the brake cam shaft in the brake application direction, either with no relative motion between the adjuster and the brake cam shaft on the brake application stroke (so-called "adjust on release), or with relative motion during brake application if adjustment is needed (so-called "adjust on apply). In either type of adjuster, if there is greater than desired distance between the brake linings and the brake drum friction surface, or excess chamber pushrod stroke, the slack adjuster is permitted to rotate relative to the brake cam shaft an angular distance sufficient to remove some or all of this undesired slack, i.e., limiting the distance the brake linings withdraw from the brake drum friction surface so that the lining-drum clearance is maintained at a desired minimum.

In many automatic slack adjusters, a clutch is used to accomplish the adjusting movement. For example, in an adjuster with a worm shaft turning a worm gear (also known as a worm wheel) that is coupled to the brake cam shaft that expands and retracts the brake friction members (i.e., drum brake linings), relative movement between the worm shaft and worm wheel and the brake actuator is permitted by a wound spring located around the worm shaft that is designed to allow shaft engagement or slippage about its longitudinal axis when the application torque is above a predetermined amount of applied torque. This relative movement of the worm shaft creates corresponding relative motion between the slack adjuster body and the brake cam shaft, with the result that the brake cam shaft does not return to its original rest position because the brake is reset to maintain a desired clearance ("air gap") between the brake linings and the brake drum friction surface. In this way the rotation of the slack adjuster relative to the brake cam shaft automatically compensates for brake lining wear.

An example of a brake actuation arrangement is shown in FIG. 1. In this figure, an automatic slack adjuster 1 is arranged between a pneumatic spring brake actuator 2 and a cam shaft 9 of a brake (not illustrated). A pushrod 3 of the actuator 2 is coupled to the adjuster 1 via a yoke 5. The actuator 2 is secured to relative to a fixed mounting bracket on the vehicle axle (not shown) using mounting studs 4. The yoke 5 is coupled to the adjuster 1 by pivot pin 6, and to an adjustment link 7 by pin 8.

In operation, when air is either admitted to the service brake chamber or removed from the parking brake chamber of the actuator 2, the actuator pushrod 3 extends axially toward the adjuster 1 (in FIG. 1, toward the right side of the figure). The brake actuation force transferred from the pushrod 3 via yoke 5 causes the adjuster 1 to rotate about the rotation axis of the brake cam shaft 9 (in FIG. 1, in the clockwise direction). This causes the brake cam shaft 9, which is splined to the worm wheel of the adjuster, to rotate and thereby force the brake linings into contact with the friction surface of the brake drum.

FIG. 2 is an illustration of internal components of an automatic slack adjuster of the type depicted in FIG. 1. In this slack adjuster 200, an adjustment link (not illustrated in this figure for clarity) similar to adjustment link 7 in FIG. 1 passes through aperture 246 such that an end of the link can engage a toothed wheel 244. The toothed wheel 244 is coupled to worm shaft 212 via a spring such that when the toothed wheel 244 rotates, the worm shaft 212 rotates about axis 214. During operations in which slack adjustment is not needed, the rotation of the worm shaft 212 is not transferred to the worm wheel 206 due to slipping of the toothed wheel 244 relative to the wound spring clutch 242. During operations in which slack adjustment is needed, the rotation of worm shaft 212 is transferred to the worm wheel 206 due to torque transmission between the toothed wheel 244, wound clutch spring 242 and worm 212. The spiral toothing of the worm 212 in turn rotates worm wheel 206 and the brake camshaft (not illustrated in this figure) concentrically located at the center of worm wheel 206. As is apparent from FIG. 2, and as is shown in FIG. 1, adjustment links frequently are laterally offset from the rotation axis of the worm shaft, and therefore have a "dog leg" shape to align the yoke connection end of the link with the yoke.

Referring again to FIG. 1, during brake application the pushrod 3 extends out from the brake actuator 2 (toward the right side of FIG. 1), causing the adjuster 1 to rotate clockwise about the brake camshaft 9 to engage the brake linings. As the adjuster 1 passes the vertical position above the brake camshaft 9, the advancing yoke 5 causes the pin 8 to pull upward on the link 7, i.e., away from the location at which the link enters the adjuster 1. If there is excessive clearance in the brake ("excess slack"), the outward-moving link 7 acts on the internal worm shaft via, for example, a lever, a cam lobe or a toothed wheel as in FIG. 2 that is located on the adjuster's worm shaft, translating the upward-directed force from link 7 into a torque about the worm shaft. This movement then adjusts the position of the cam shaft so that the excess slack is removed from the brake and the amount of slack falls within a predetermined range. If the torque applied to the worm shaft exceeds a predetermined torque limit, the wound spring clutch which couples the worm shaft to the worm allows slippage of the lever, cam lobe or toothed wheel. allowing relative movement between the adjuster 1 and the brake cam shaft 9. In this case no adjustment occurs.

A potential problem with automatic slack adjusters is damage to the linkage between the brake actuator and the slack adjuster caused by binding or other forms of excessive resistance in the force transmission path between the actuator and the adjuster. For example, a typical spring brake actuator includes a pneumatic diaphragm arranged to push an actuator pushrod axially outward when pneumatic pressure is applied to the service brake portion of the actuator, and a power spring that applies a parking brake force to the pushrod when the parking brake portion of the spring brake actuator is deaerated and the power spring is thereby allowed to axially expand in the brake application direction. During outward movement of the pushrod, if the adjuster link 7 reaches a point at which it cannot be pulled further out of the slack adjuster body by the yoke 5 (i.e., if the travel of the link is limited to a maximum extension by, for example, a physical stop or the interaction of the link with the brake camshaft, worm wheel, worm and/or wound spring clutch), the high level of brake application force being applied by the service brake diaphragm or the power spring to the pushrod may deform or otherwise damage the pushrod or other components in the force application path.

This and other problems are addressed by the present invention, which provides the adjustment link with a resilient portion that is capable of accommodating excess actuator pushrod stroke or interaction force with other components.

In one embodiment of the present invention, the resilient portion is located co-axially within the link, using a telescoping shaft arrangement with sufficient axial displacement capacity between the upper and lower portions of the adjuster link to avoid limiting the motion of the attached yoke and consequent potential pushrod deformation.

In another embodiment, a spring of the resilient portion is located on the upper portion of the adjuster link, which is a straight rod that extends through an aperture in an elbow of the lower portion of the adjuster link, with the spring captured between a lower end of the upper link and an underside surface of the lower portion elbow.

In a further embodiment, one end of the spring is located against a displaceable spring stop that may be axially displaced to adjust an amount of preload applied to the spring. Adjustment of the displaceable spring stop permits adjustment of the predetermined level of force required to initiate axial displacement of the resilient portion of the adjuster link. This displacing force must be higher than a force required for the adjuster link to initiate actuation of the slack adjustment by the adjuster drive in the slack adjuster housing in order to ensure that any required slack adjustment is performed before the adjuster link axial length changes.

The present invention is not limited to automatic slack adjuster applications, but may be used in other application in which axial elongation of a link may be limited in a manner that causes binding or other deformation-inducing damage to other components in a force-transmission path.

Other objects, advantages and novel features of the present invention will become apparent from the following detailed description of the invention when considered in conjunction with the accompanying drawings.

BRIEF DESCRIPTION OF THE DRAWINGS

FIG. 3 is a partial cross-section view of an adjustment link in accordance with an embodiment of the present invention.

FIG. 4 is an adjustment link in accordance with another embodiment of the present invention.

DETAILED DESCRIPTION OF THE DRAWINGS

Figure 1:
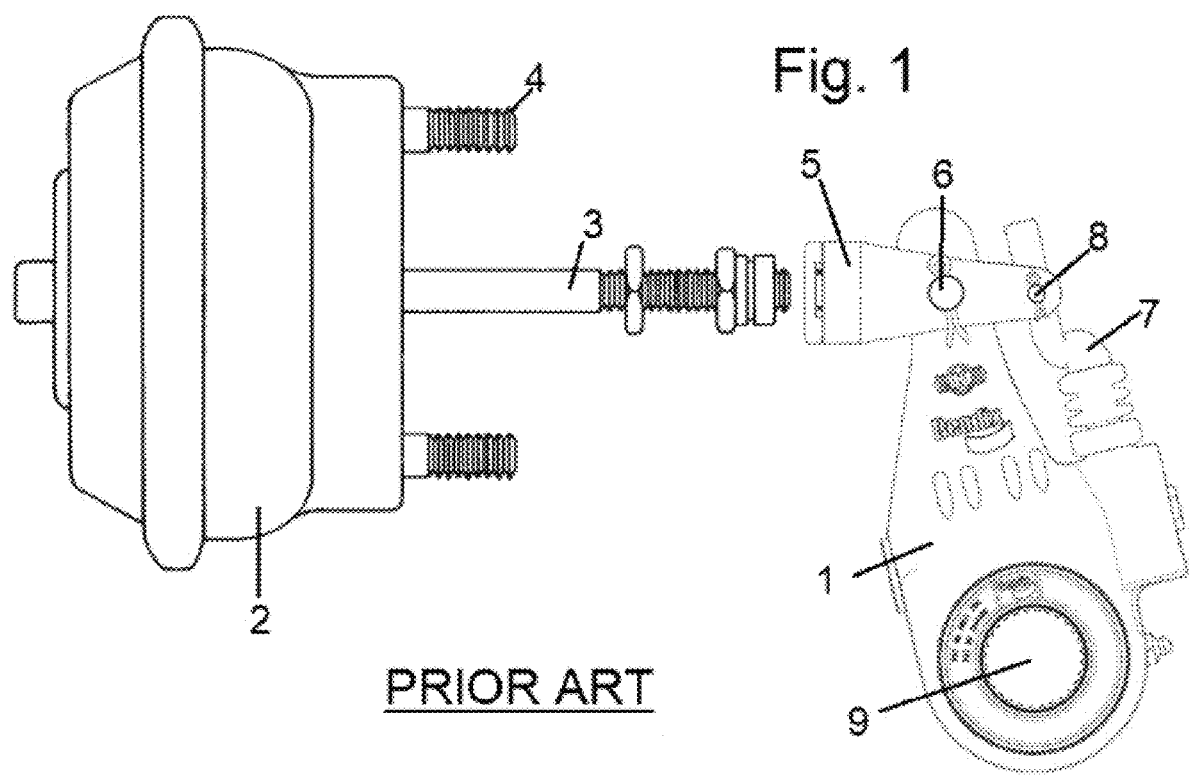
FIG. 1 is an elevation view of a prior art spring brake actuator and slack adjuster.
Figure 2:
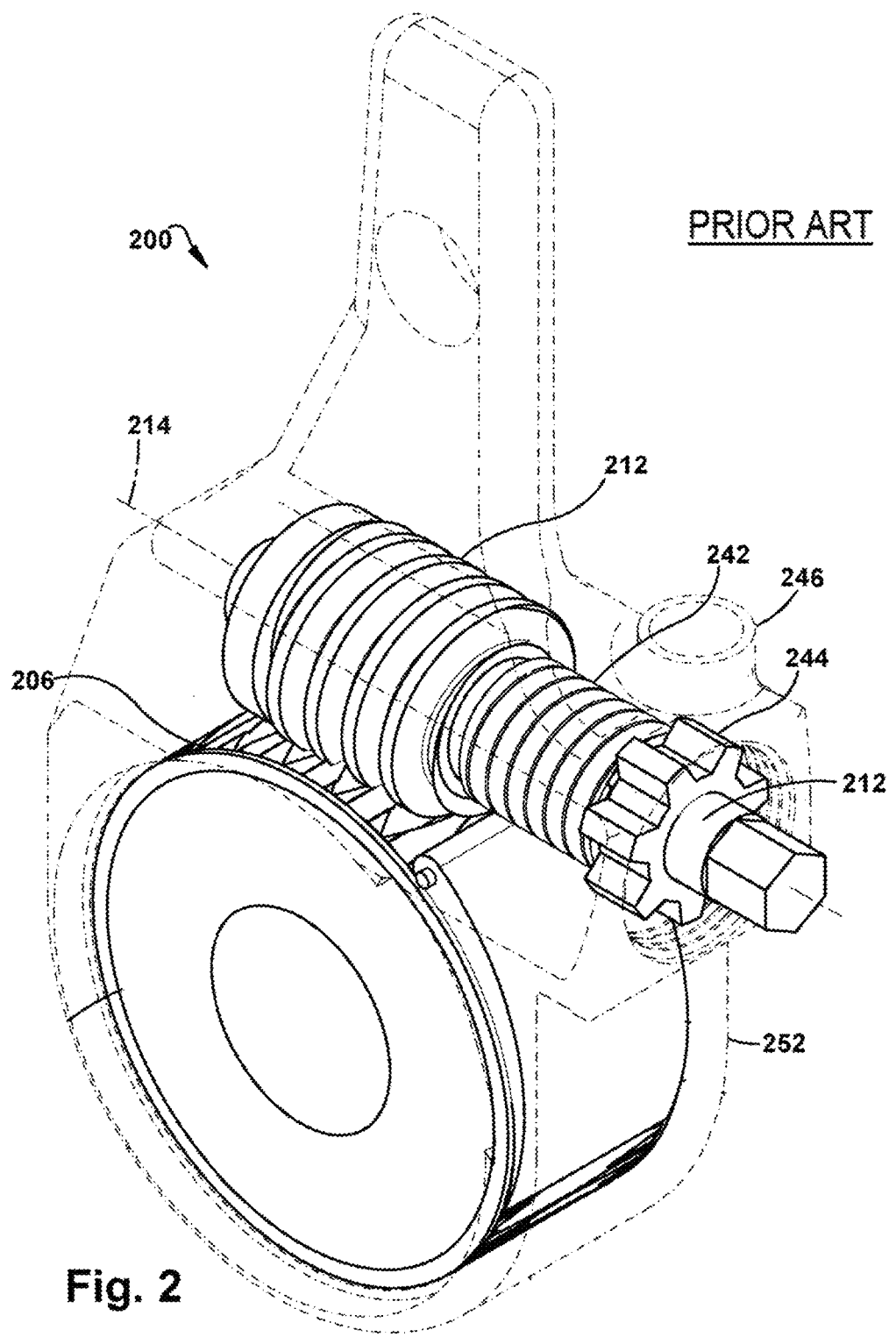
FIG. 2 is a perspective view of a slack adjuster worm wheel arrangement of prior art slack adjuster.

FIG. 3 illustrates a first embodiment of a resilient adjustment link in accordance with the present invention. The link 300 includes an upper portion 301 and a lower portion 302 above and below, respectively, the dog-leg portion 303 of the link. The upper portion 301 includes an aperture 304 for coupling of the link to a yoke of an automatic slack adjuster. The lower portion includes teeth 305 configured to interact with a worm shaft gear wheel in the slack adjuster.

A resilient portion 306 of the link 300 is formed in this embodiment in the upper portion 301. The resilient portion includes an outer tubular section 307 having a spring seat 308 at the dog-leg end of the tubular section 307. A counterpart post 309 extends from the dog leg section 303 toward the yoke end of the link upper portion 301, and has a second spring seat 310 at the upper end post 309. The post 309 is arranged within the tubular section 307, along with a spring 311 concentrically located on the post 309 and captured between the lower spring seat 308 and the upper spring seat 310.

In operation, before the link 300 reaches the end of its normal range of travel, i.e., before the link lower portion 302 can no longer extend farther out of the slack adjuster housing, the resilient portion of the link remains in its inactive position, with the spring 311 at its maximum captured length. In contrast, if the link lower portion 302 reaches its travel limit before the brake actuator pushrod movement is terminated, the link upper portion 301 can telescope outward against the bias of spring 311, thereby minimizing or eliminating the potential for deformation of the pushrod or other components by the brake actuator.

Amount of axial travel of resilient portion of the link may be set at a fixed amount which is anticipated to be sufficient to provide damage protection or a preset force resistance value for a wide variety of slack adjuster installations, or may be tailored to one or more individual applications with enough axial travel to be able to accommodate the maximum expected outward extension of the brake actuator pushrod, taking into account the geometry of the yoke between the push rod and the adjuster link.

The spring rate and spring force generated over the length of compression of the spring 311 preferably is also tailored to the application. Automatic slack adjusters typically operate with adjustments being made within a range of forces. For example, one slack adjuster may be designed with a minimum wound spring action threshold generated by the interaction of the adjuster link with the worm shaft (the axial force from the link being converted into a torque about the worm shaft rotation axis), and be able to tolerate maximum torque before actuator pushrod damage may ensue. In such an application, the spring force of spring 311 must be high enough to allow the wound spring to engage and operate as intended before permitting the link resilient portion 306 to begin to telescope, while also being low enough that after the link lower portion 302 reaches the end of its travel, the link can telescope before reaching the threshold for damaging the actuator pushrod.

In the embodiment shown in FIG. 4, the arrangement of the resilient portion 406 of the adjuster link 400 is reversed as compared to the FIG. 3 embodiment, being located below the dog-leg portion 403, in the lower portion 402 of the link 400. Such an approach may be desired in applications in which there is greater installation space below the dog-leg portion than above. In this embodiment the post 409 continues to be associated with the lower portion 402, but the arrangement of the telescoping portions 409, 410 also may be reversed such that the outer tubular portion 407 is on the link lower portion 402. (The aperture 404, teeth 405, spring seat 408 and spring 411 correspond to similar features 304, 305, 308 and 311 in FIG. 3.)

Figure 5:
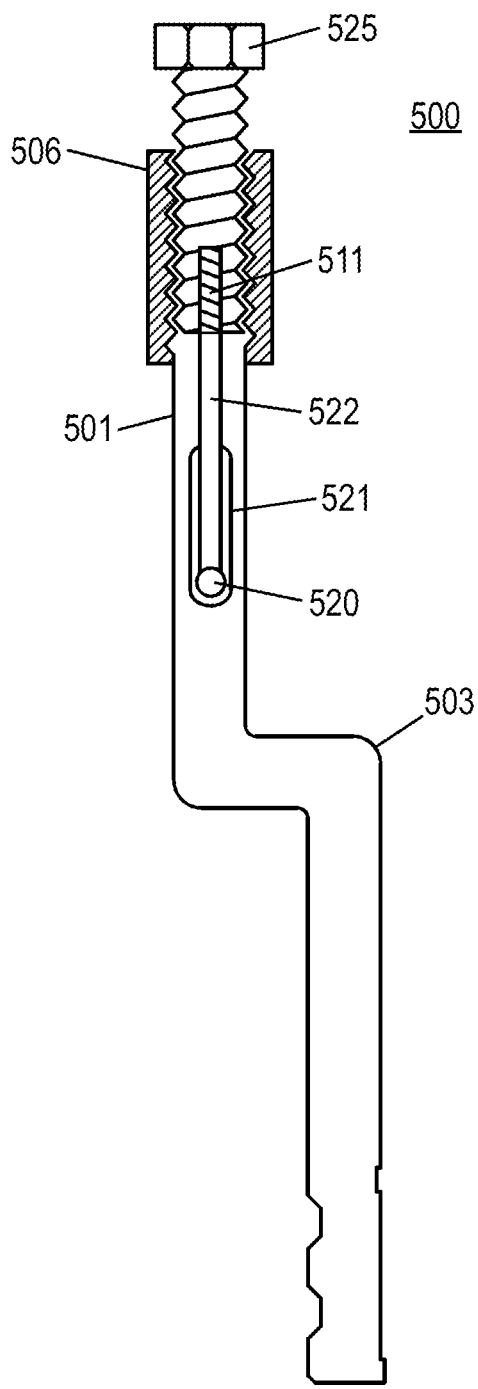
FIG. 5 is an adjustment link in accordance with a further embodiment of the present invention. is an adjustment link in accordance with an embodiment of the present invention.

In the FIG. 3 embodiment, the link resilient portion 306 is completely encapsulated within the upper portion 301, protected from the environment. The partial cross-section view in FIG. 5 shows a further embodiment of the present invention which is potentially advantageous when there is sufficient installation space above the yoke. Here, the resilient portion 506 of the link 500 is arranged above the yoke connection point. This embodiment also uses a different approach to creating the resilient portion, in which the pin 520 connecting the link to the yoke (not shown for clarity) is arranged in an axial slot 521, with a piston 522 abutting an upper surface of the connection pin 520. An upper end of the piston 522 has a reduced diameter portion on which is arranged a spring 511. The spring is captured between the larger diameter portion of the piston 522 and a lower end of a fastener or other device 525, which includes an internal bore sized to accommodate the reduced diameter portion of the piston 522 as this portion telescopes into the fastener or other device during axial extension of the adjuster link 500. For ease of assembly in this embodiment, external threads of the fastener or other device 525 thread into counterpart internal threads of the adjuster link 500. While the axial slot 521 in this embodiment would otherwise open the joint between the yoke and the adjuster link to the environment, a suitable cover, such as a form-fitted elastomeric jacket, may be installed to protect the joint from environmental contamination.

Figure 6:
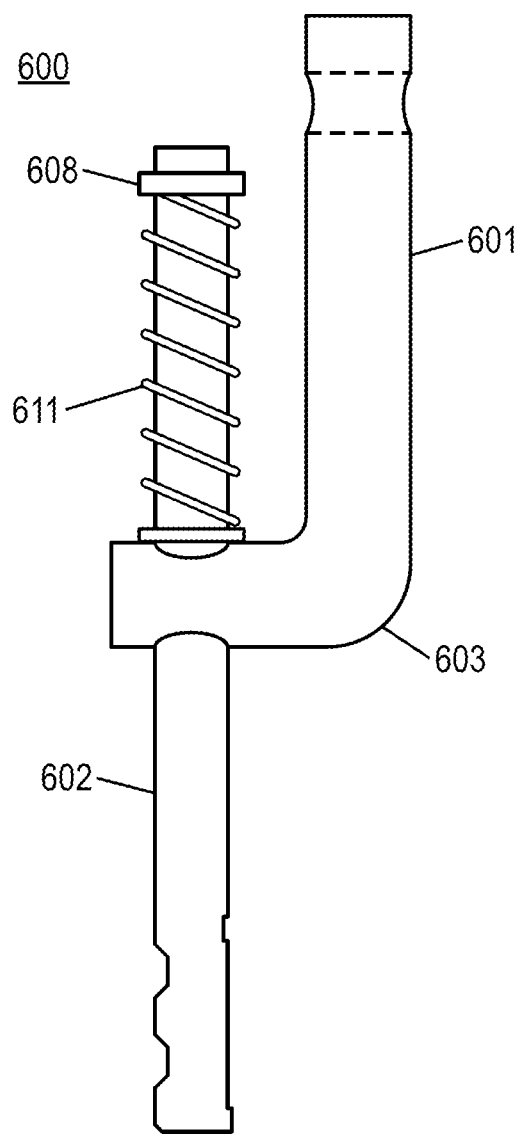
FIG. 6 is an adjustment link in accordance with a further embodiment of the present invention. is another adjustment link in accordance with an embodiment of the present invention.

FIG. 6 illustrates another embodiment which, while substantially exposed to the environment if the link is not enclosed in a protective cover, provides a particularly simple and cost-efficient approach to providing the desired resiliency in the adjuster link. In this embodiment the link 600's upper portion 601 is formed with a simple turned section 603 at is lower end. This turned section includes an aperture which receives the link lower portion 602, which preferably is formed as a simple straight rod. At the upper end of the lower portion 602 a spring retainer 608 serves as a lower spring seat for a spring 611, which abuts the upper surface of the turned section 603 at the spring's lower end. As with the previous embodiments, when the brake actuator acts through the yoke to extend the adjuster link 600, the link upper portion 601 may be resiliently displaced upward relative to the link lower portion 602 when the brake actuator force exceeds a predetermined threshold force (i.e., after the link lower portion 602 has reached the end of its maximum upward travel).

The foregoing embodiments are not intended to be limited to the particular detail arrangements shown in the drawings. For example, the various spring stops may be embodied in several different ways as long as they ensure the link spring remains captured. For example, the lower spring stop 608 may be in the form of a fastener installed on the end of a threaded portion of the link lower portion 602, or may be a "snap on" type of device, such as an "E-clip." Further, the link spring need not be located solely in a compression arrangement, but may be arranged such that the spring is maintained in tension. For example, in the FIG. 5 embodiment the spring could be located below the pin 520, either inside or outside of the link lower portion, and anchored at the spring's lower end on the link lower portion. This would necessitate the link upper portion 501 to extend below the pin 520 (the pin fitting in a bore at a fixed height in the upper portion), and the axial slot 521 being located in the link lower portion. This arrangement would allow the link upper portion 501 to telescope outward from the dog-leg portion 503 as the pin 520 begins to move upward in axial slot 521, while the spring increases in length under tension.

A significant advantage of the present invention is the resilient link's providing the opportunity to eliminate the need for a torque limiting clutch or other similar mechanism in the slack adjuster. If the torque applied to the worm shaft exceeds a predetermined torque limit, the present invention could provide the aforementioned predetermined "slip" or "disconnect" between the presently found wound spring clutch which couples the worm shaft to the worm wheel. In the prior art, this coupling slips, allowing relative movement between the adjuster 1 and the brake cam shaft 9 when needed. With the present invention, the movement of the link at a predetermined force level could serve as the "slip" or "disconnect" for the system.

The foregoing disclosure has been set forth merely to illustrate the invention and is not intended to be limiting. For example, one of ordinary skill would recognize that the location of the one-way clutch assembly of the adjustment mechanism may vary along the axial length of the worm shaft, as long as the bore for the gear drive for the one-way clutch adjuster is located out of the primary brake application force load path through the automatic slack adjuster housing so as to minimize the stress in the thin-wall section between the gear drive bore and the brake camshaft bore. Because such modifications of the disclosed embodiments incorporating the spirit and substance of the invention may occur to persons skilled in the art, the invention should be construed to include everything within the scope of the appended claims and equivalents thereof.

What is claimed is:
1. An adjuster link for a slack adjuster, comprising:
an adjuster link upper portion configured to be connected to a slack adjuster brake application force-receiving yoke;
an adjuster link lower portion configured to interact with an adjuster drive at a slack adjuster housing,
wherein
the adjuster link includes a resilient portion, the resilient portion including a lower portion of the adjuster link upper portion which axially overlaps an upper portion of the adjuster link lower portion in an axial-overlap region of the resilient portion,
the adjuster link lower portion and the adjuster link upper portion are biased against one another in a direction which minimizes a length of the adjuster link by a resilient element in contact with the adjuster link lower portion and the adjuster link upper portion in the axial-overlap region, the resilient element is a spring in the resilient portion which biases the adjuster link upper portion axially toward the adjuster link lower portion, and the resilient portion is configured to change an axial length of the adjuster link when the brake application force applied to the adjuster link by the yoke exceeds a predetermined minimum force by axial displacement of the axially overlapping portions of the lower portion of the adjuster link upper portion relative to the upper portion of the adjuster link lower portion.

2. The adjuster link of claim 1, wherein the spring in the resilient portion is compressed when the axial length of the adjuster link increases.

3. The adjuster link of claim 1, wherein the spring in the resilient portion is in tension when the axial length of the adjust link increases.

4. The adjuster link of claim 1, wherein
at least one of the adjuster link upper and lower portions includes a first spring stop against which a first end of the resilient portion spring is biased, and
the other of the at least one of the adjuster link upper and lower portions includes a second spring stop against which a second end of the resilient portion spring is biased.

5. The adjuster link of claim 4, wherein the first spring stop is arranged across a hollow portion of the at least one of the adjuster link upper and lower portions.

6. The adjuster link of claim 5, wherein the first spring stop is a cross-pin.

7. The adjuster link of claim 5, wherein the first spring stop is a cross-pin or a fastener configured to connect the adjuster link upper portion to the yoke.

8. The adjuster link of claim 6, wherein
the resilient portion includes a spring guide co-axially arranged with the resilient portion spring, and
the spring guide is configured to telescope into a corresponding bore in the upper portion.

9. The adjuster link of claim 8, wherein the upper portion bore is located in an upper portion end plug.

10. The adjuster link of claim 9, wherein the upper portion end plug is axially displaceable to adjust a preload of the resilient portion spring.

11. The adjuster link of claim 10, wherein the upper portion end plug is a bolt threaded axially into the adjuster link upper portion.

12. The slack adjuster of claim 11, wherein the adjuster link upper portion is arranged to pass axially toward the adjuster link lower portion through an aperture of the adjuster link lower portion.

13. A slack adjuster, comprising:
a housing having a brake actuator arm and an aperture for receiving a brake cam shaft;
a worm wheel co-axially located within the housing aperture, the worm wheel being configured to co-axially engage the brake cam shaft for conjoint rotation;
a yoke connected to the brake actuator arm, the yoke being configured to receive and transfer a brake application force to the brake actuator arm;
an adjuster drive arranged to rotate the worm wheel relative to the housing to adjust an amount of rotational slack in the slack adjuster; and
an adjuster link extending between the yoke and the adjuster drive,
wherein
the adjuster link is configured to transfer a slack adjustment movement from the yoke to the adjuster drive,
the adjuster link includes a resilient portion, the resilient portion including a lower portion of an adjuster link upper portion which axially overlaps an upper portion of an adjuster link lower portion in an axial-overlap region of the resilient portion,
the adjuster link lower portion and the adjuster link upper portion are biased against one another in a direction which minimizes a length of the adjuster link by a resilient element in contact with the adjuster link lower portion and the adjuster link upper portion in the axial-overlap region,
the resilient element is a spring in the resilient portion which biases the adjuster link upper portion axially toward the adjuster link lower portion, and
the resilient portion is configured to change an axial length of the adjuster link when the brake application force applied to the adjuster link by the yoke exceeds a predetermined minimum force by axial displacement of the axially overlapping portions of the lower portion of the adjuster link upper portion relative to the upper portion of the adjuster link lower portion.

14. The slack adjuster of claim 13, wherein
a spring in the resilient portion biases the adjuster link upper portion axially toward the adjuster link lower portion,
the slack adjuster is configured such that during brake application the yoke applies a force to the adjuster link in a direction away from a worm wheel portion of the housing, and
the yoke is configured to increase the axial length of the adjuster link after exceeding the predetermined minimum force.

15. The slack adjuster of claim 14, wherein the adjuster link upper portion is arranged to pass in the direction away from the worm wheel portion of the housing through an aperture of the adjuster link lower portion.

16. The slack adjuster of claim 15, wherein the resilient portion spring is on the adjuster link upper portion and is on a worm wheel side of the adjuster link lower portion aperture.

* * * * *